US008719792B2

(12) United States Patent
Chauvet et al.

(10) Patent No.: US 8,719,792 B2
(45) Date of Patent: May 6, 2014

(54) CORRECTING JOB CONTROL LANGUAGE JOB ERRORS

(75) Inventors: Philip R. Chauvet, Tucson, AZ (US); David C. Reed, Tucson, AZ (US); Michael R. Scott, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1769 days.

(21) Appl. No.: 12/053,672

(22) Filed: Mar. 24, 2008

(65) Prior Publication Data
US 2009/0240988 A1    Sep. 24, 2009

(51) Int. Cl.
*G06F 9/44*    (2006.01)

(52) U.S. Cl.
USPC ............ 717/126; 717/141; 717/142; 717/143

(58) Field of Classification Search
None
See application file for complete search history.

(56) References Cited

U.S. PATENT DOCUMENTS

| | | | |
|---|---|---|---|
| 4,310,883 A * | 1/1982 | Clifton et al. ........................... | 1/1 |
| 5,321,835 A * | 6/1994 | Tanaka et al. ................... | 718/101 |
| 5,748,884 A * | 5/1998 | Royce et al. ..................... | 714/57 |
| 6,092,147 A * | 7/2000 | Levy et al. .......................... | 711/6 |
| 6,430,708 B1 | 8/2002 | Evans | |
| 7,409,586 B1 * | 8/2008 | Bezbaruah et al. .............. | 714/13 |
| 7,536,505 B2 * | 5/2009 | Takakuwa ...................... | 711/114 |
| 7,870,540 B2 * | 1/2011 | Zare et al. ...................... | 717/126 |
| 8,079,018 B2 * | 12/2011 | Huene et al. ................... | 717/124 |
| 2004/0010451 A1 * | 1/2004 | Romano et al. .................. | 705/26 |
| 2004/0111709 A1 * | 6/2004 | Furst et al. ...................... | 717/131 |
| 2004/0122799 A1 * | 6/2004 | Goyal et al. ....................... | 707/2 |
| 2005/0081192 A1 * | 4/2005 | DeLine et al. ................. | 717/126 |
| 2005/0256858 A1 * | 11/2005 | McArdle ........................... | 707/4 |
| 2006/0230319 A1 * | 10/2006 | Ryali et al. ...................... | 714/38 |
| 2007/0088726 A1 * | 4/2007 | Daos et al. .................... | 707/101 |
| 2007/0226693 A1 * | 9/2007 | Chatlain et al. ............... | 717/126 |
| 2008/0172579 A1 * | 7/2008 | Hahm et al. .................... | 714/37 |
| 2008/0177994 A1 * | 7/2008 | Mayer .............................. | 713/2 |

FOREIGN PATENT DOCUMENTS

| | | |
|---|---|---|
| JP | 363012027 A | 1/1988 |
| JP | 363211433 A | 9/1988 |
| JP | 402253336 A | 10/1990 |
| JP | 403037718 A | 2/1991 |
| JP | 404260125 A | 9/1992 |
| JP | 406259235 A | 9/1994 |

OTHER PUBLICATIONS

"Module 1 JCL Revision", Legac-e Education, 2004.*

* cited by examiner

*Primary Examiner* — Lewis A Bullock, Jr.
*Assistant Examiner* — Christine Dang
(74) *Attorney, Agent, or Firm* — Yudell Isidore Ng Russell PLLC

(57) ABSTRACT

A method of correcting job control language (JCL) jobs scans a JCL job against a set of JCL syntax rules. The method automatically corrects any syntax errors discovered during the scanning, thereby forming a corrected JCL job. The method then runs the corrected JCL job. If the corrected JCL ends abnormally due to an execution error, the method then automatically determines if the execution error is recoverable. If the execution error is recoverable, the method automatically corrects the recoverable error to form a recovered corrected JCL job. The method reruns the recovered corrected JCL job.

15 Claims, 3 Drawing Sheets ated at decision block 105, the scan detects an error, the method
CORRECTING JOB CONTROL LANGUAGE JOB ERRORS

BACKGROUND OF THE INVENTION

1. Technical Field

The present invention relates generally to the field of Job Control Language (JCL) programming and program execution, and more particularly to a method of automatically correcting JCL jobs prior to and during execution.

2. Description of the Related Art

Job Control Language (JCL) is a scripting language used on IBM Enterprise System operating systems, such as z/OS, to instruct the Job Entry Subsystem (JES2 or JES3) on how to run a batch program or start a subsystem. JCL is a very precise language. It has specific rules of grammar and syntax that must be followed. For example, JCL statements, except for comments or in-stream data, must contain only upper case letters. Many programming languages accept variable numbers of spaces, upper or lower case letters, and other inconsistent uses of commands. A JCL job must not contain any irregularities. The JCL job will be rejected if it contains typographical errors, extra or missing spaces or commas, fields in the wrong order, etc.

Many JCL jobs are relatively low priority non-mission critical jobs that tend to be run during periods of lower computer use. For example, JCL jobs are often scheduled to run late at night or early in the morning. Even if a JCL job is syntactically correct, the job may contain other errors that cause the job to end abnormally without completing. Currently, such abnormal ending requires human intervention to correct the runtime error and restart the job. When a JCL job ends abnormally during non-business hours, no one may be available to correct the problem. Thus, scheduled JCL jobs may have to wait until the next day to complete.

SUMMARY OF THE INVENTION

The present invention provides a method of correcting job control language (JCL) jobs. Embodiments of the present invention scan a JCL job against a set of JCL syntax rules. The method automatically corrects any syntax errors discovered during the scanning, thereby forming a corrected JCL job. The method then runs the corrected JCL job. If the corrected JCL ends abnormally due to an execution error, the method then automatically determines if the execution error is recoverable. If the execution error is recoverable, the method automatically corrects the recoverable error to form a recovered corrected JCL job. The method reruns the recovered corrected JCL job.

Some embodiments of the present invention include an auto-resubmit option. If the auto-resubmit option is enabled, the method automatically reruns the recovered corrected JCL job. The method continues to correct recoverable errors and rerun the corrected JCL job until the job completes. If the embodiment does not include the auto-resubmit option or the auto-resubmit option is disabled, the method notifies a user that a recoverable error has been automatically corrected. The user may review the correction and cause the method to rerun the recovered corrected JCL job. Alternatively, the user may cause the method to rerun the recovered corrected job without first reviewing the correction.

There are many examples of recoverable errors that the method can automatically correct. For example, if the recoverable error is a dataset not found error, method automatically executes a catalog locate to find a correct volume serial number. If the recoverable error is an out of space error or a volume fragmentation error, the method automatically executes a system managed storage automatic class selection routine to find a volume or storage group with sufficient space.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
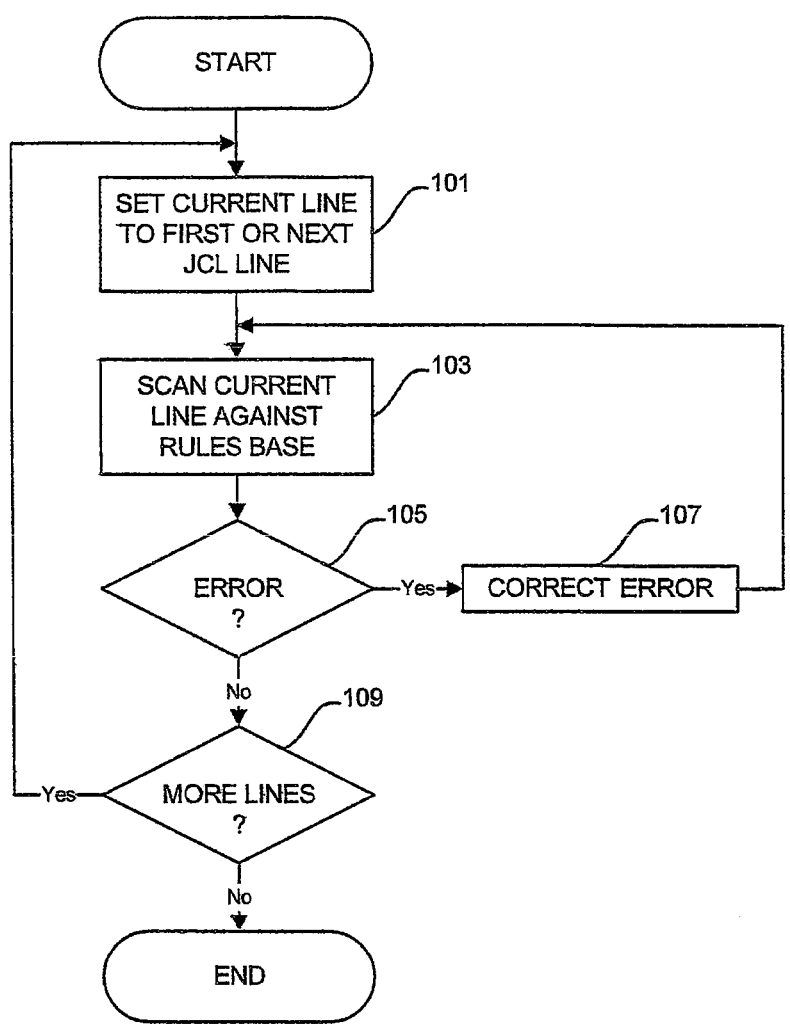
FIG. 1 is a flow chart of an embodiment of JCL job scanning and syntax error correction according to the present invention.

FIG. 1 is a flow chart of an embodiment JCL job pre-scanning according to the present invention, which may be performed by any suitably programmed computer. The method sets the current line to the first or next line in the JCL job, at block 101. The method scans the current line against a JCL syntax rules base, at block 103. If, as determined at decision block 105, the scan detects an error, the method corrects the error, at block 107, and processing returns to block 103. If no errors are detected in the current line, the method determines, at decision block 109, if there are more lines in the JCL job. If so, processing returns to block 101. Processing according to FIG. 1 thus continues until all syntax errors in the JCL job have been corrected.

In constructing a rules base, JCL syntax must satisfy some basic rules. Some of them are:

A JCL statement consists of one or more 80-byte records. Records in a JCL can be longer, specifically for in-stream data, but the job entry subsystem uses only the first 80 bytes. The physical record should not exceed 255 bytes.

A JCL statement must be in uppercase; however, in stream data can contain lowercase.

JCL must be in columns 1-71 (except comments). Often, columns 73-80 are used for sequence numbers.

To continue a line longer than 71 characters (except comments), the first line is finished after a comma, and the next line is started between columns 4 and 16, with // in the first two columns.

JCL systems consist of five types of fields:

1. //: Two forward slashes are always in columns 1 and 2.

2. NAME FIELD: If it is coded, it must follow the // starting in column 3.

3. OPERATION FIELD: This is separated from the name field by at least one blank space; it indicates what the job entry subsystem is to do.

4. OPERAND FIELD: this field is separated from the operation field by at least one blank. The operand field lists all parameters, some of which are mandatory and some of which are optional, that directed the job entry subsystem to perform the required operation. The operand field can have no spaces; operands are separated by commas.

5. COMMENTS: Comments can be placed after blank after the last operand.

The name field identifies a statement so that other statements can refer to it. It must began in column 3 and be from one to eight characters long. It may include only uppercase alphabetics, numbers, or national characters (#, @, and $); however the name may not begin with the number.

The most common operation field values are:

JOB, which indicates the start of a job;

EXEC, which requests the execution of a program or a PROC;

DD, which defines the usage of some data, typically a dataset or a report;

PROC, which indicates the start of the definition of a PROC; and,

PEND, which indicates the end of the definition of a PROC.

Less commonly used operation field values include JOBLIB, JCLLJB, INCLUDE, SET, and IF.

The exact layout of the operand field depends on the operation field. Most operations require some positional parameters. They must be the first parameters in the operand field, and the sequence is fixed. Parameters are separated by commas. After the positional parameters can be several optional keyword parameters. Their sequence is not important, and they always have a keyword, followed by an equal (=) sign, and then the value that should be used for the specified keyword. A typical example is the file name for a DD statement, which uses the optional data set name (DSN) keyword:

//SYSUT1 DD DSN=SYS1.SYSTEM.FILE,DISP=SHR

Although many parameters are optional, often an operation will require at least one of a subset of optional fields to be present. It is also quite common that some optional fields or specific values cannot be used together. For example, specifying a printer for an output does not go together with the filename.

Comments on the same line as JCL statements follow the parameter field, and are separated from it by at least one blank. To continue comments that would exceed column 71, a non-blank is coded in columns 72, followed by // in columns 1 and 2 of the next line.

Every job starts with a JOB statement and ends with an empty // card image. Each step within a job has one EXEC statement and any number of DD statements, one for each data set access.

Figure 2:
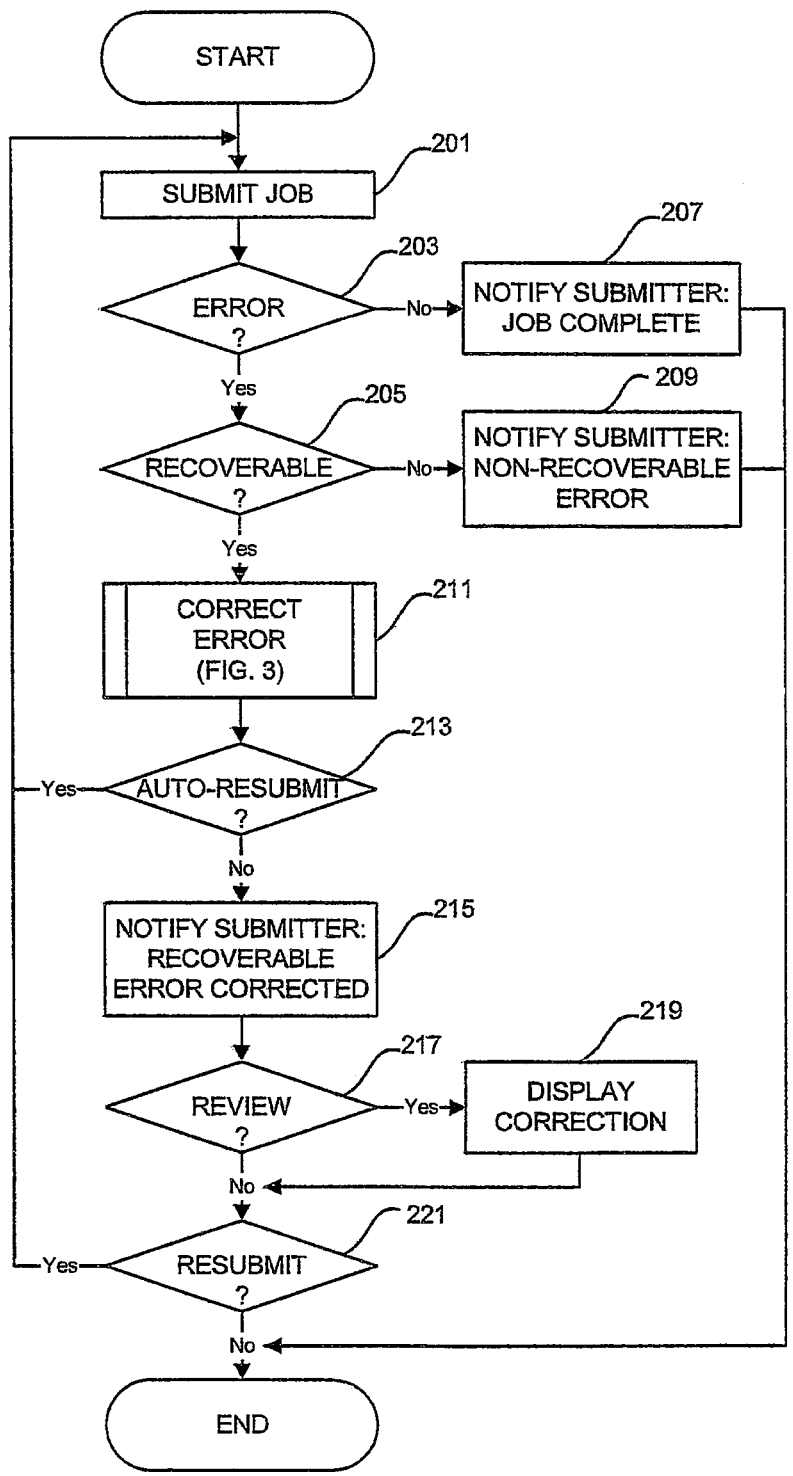
FIG. 2 is a flow chart of an embodiment of runtime JCL job processing according to the present invention; and, FIG. 3 is a flow chart of an embodiment of recoverable error correction according to the present invention.

FIG. 2 is a flow chart of an embodiment of runtime JCL job processing according to the present invention. The method submits the job, at block 201. If, as determined at decision block 203, execution ends abnormally prior to completion, the method determines from the error message if the error is recoverable, as indicated at decision block 205. If, at decision block 203, the job completes without error, the method notifies a submitter the job has completed, at block 207, and processing ends.

Returning to decision block 205, the method may determine whether or not an error is recoverable by referring to a table, or the like, of recoverable errors. If the method determines the error not to be recoverable, the method notifies a submitter of the non-recoverable error, at block 209, and processing ends. If the method determines the error to be recoverable, the method goes to FIG. 3 and corrects the error, as indicated generally at block 211. After correcting the error according to FIG. 3, processing returns to FIG. 2, at decision block 213.

Embodiments of the present invention may include an auto-resubmit feature or option. If, as determined at decision block 213, the auto-resubmit feature is enabled, processing returns to block 201. Thus, if auto-resubmit is enabled, processing according to FIG. 2 continues until the job completes or the method encounters a non-recoverable error. If the embodiment of the present invention does not include the auto resubmit feature or if the auto resubmit feature is not enabled, the method notifies a submitter that a recoverable error has been corrected, as indicated at block 215, and prompts the submitter to review and/or resubmit the corrected JCL job. If, as determined at decision block 217, the method displays the correction to the submitter, at block 219. If, as determined at decision block 221, a submitter elects to resubmit the job, processing returns to block 201.

Figure 3:
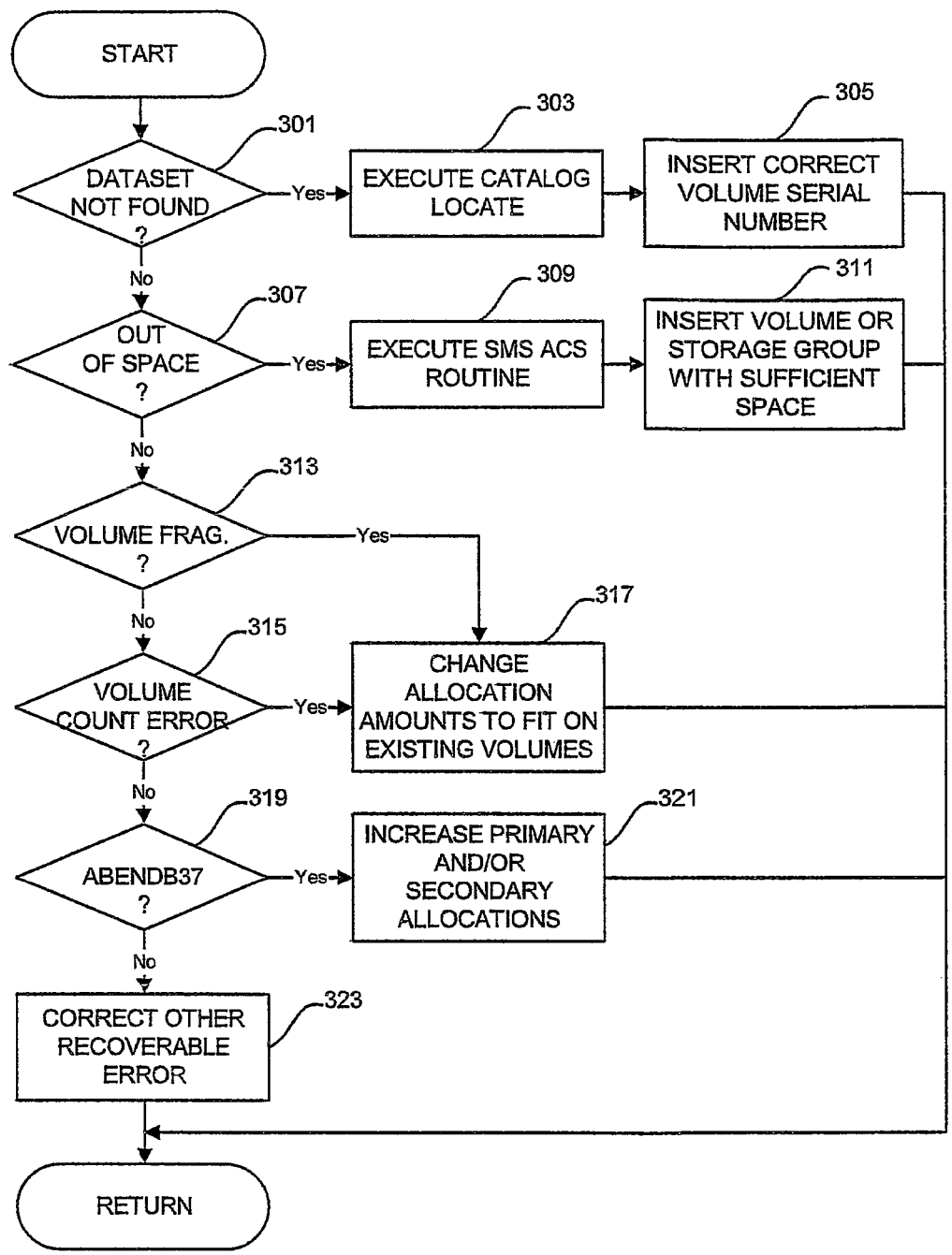

FIG. 3 is a flow chart illustrating examples of runtime error correction according to embodiments of the present invention, indicated generally at block 211 of FIG. 2. If, as determined at decision block 301, the job encounters a dataset not found error, the method executes a catalog locate, at block 303, to find the correct volume serial number. The method then inserts the correct volume serial number, at block 305, and processing returns to FIG. 2. If, as determined at decision block 307, the job encounters an out of space error, the method executes a storage management system (SMS) automatic class selection (ACS) routine to find a volume or storage group with sufficient space, at block 309, and corrects the error at block 311. If, as determined at decision block 313, the job encounters a volume fragmentation error, or, as determined, at decision block 315, the job encounters a volume count error, the method changes the allocation amounts to fit on existing volumes, at block 317. If, as determined at decision block 319, the job encounters an error identified by ABEND CODE B37, which indicates that the jobs output data sets do not have enough available space to allow the necessary secondary allocations to be made or the output data set has used all secondary allocations but still requires more space, the method increases the primary and/or secondary allocations, as indicated at block 321. As indicated at block 323, if the recoverable error is not one of those listed above, the method corrects the other recoverable error and processing returns to decision block 213 of FIG. 2.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of correcting job control language (JCL) jobs, which comprises:
  (a) scanning a JCL job against a set of JCL syntax rules;
  (b) automatically correcting any syntax errors discovered during said scanning to form a corrected JCL job, including:
    identifying an operation field value in the JCL job, the operation field value comprising one of JOB, EXEC, DD, PROC, and PEND;
    determining, based on the identified operation field, a required layout of an operand field associated with the identified operation field, wherein if the operation field requires positional parameters, the positional parameters are the first parameters in the operand field, and any optional keyword parameters follow the positional parameters; and
    determining that current data in the operand field associated with the identified operation field does not comport to the required layout;
  (c) running said corrected JCL job;

(d) if said corrected JCL job ends due to an execution error, automatically determining if said execution error is recoverable;
(e) if said execution error is recoverable: automatically correcting said recoverable error to form a recovered corrected JCL job; and
(f) rerunning said recovered corrected JCL job;
(g) if said execution error is not recoverable, notifying a submitter of the non-recoverable error.

2. The method as claimed in claim 1, including:
repeating (d)-(f) until said JCL job completes.

3. The method as claimed in claim 1, including:
prior to (f), notifying a user that said recoverable error has been corrected; and
prompting said user to review said recovered corrected JCL job.

4. The method as claimed in claim 3, including:
executing (f) after said user reviews said recovered corrected JCL job.

5. The method as claimed in claim 1, wherein said automatically correcting said recoverable error includes:
if said recoverable error is a dataset not found error, automatically executing a catalog locate to find a correct volume serial number.

6. The method as claimed in claim 1, wherein said automatically correcting said recoverable error includes:
if said recoverable error is an out of space error, automatically executing a system managed storage automatic class selection routine to find a storage area with sufficient space.

7. The method as claimed in claim 1, wherein said automatically correcting said recoverable error includes:
if said recoverable error is a volume fragmentation error, automatically changing allocation amounts to fit on existing volumes.

8. The method as claimed in claim 1, wherein said automatically correcting said recoverable error includes:
if said recoverable error is a volume count error, automatically changing allocation amounts to fit on existing volumes.

9. A method of correcting job control language (JCL) jobs, which comprises:
(a) scanning a JCL job against a set of JCL syntax rules;
(b) automatically correcting any syntax errors discovered during said scanning to form a corrected JCL job, including:
identifying an operation field value in the JCL job, the operation field value comprising one of JOB, EXEC, DD, PROC, and PEND;
determining, based on the identified operation field, a required layout of an operand field associated with the identified operation field, wherein if the operation field requires positional parameters, the positional parameters are the first parameters in the operand field, and any optional keyword parameters follow the positional parameters; and
determining that current data in the operand field associated with the identified operation field does not comport to the required layout;
(c) running said corrected JCL job;
(d) if said corrected JCL job ends due to an execution error, automatically determining if said execution error is recoverable;
(e) if said execution error is recoverable, automatically correcting said recoverable error to form a recovered corrected JCL job;
(f) if an automatic resubmit option is enabled, automatically rerunning said recovered corrected JCL job;
(g) if said automatic resubmit option is disabled, notifying a user that said recoverable error has been corrected; and
(h) prompting said user to review said recovered corrected JCL job;
(i) if said execution error is not recoverable, notifying a submitter of the non-recoverable error.

10. The method as claimed in claim 9, including:
if an automatic resubmit option is enabled, repeating (d)-(f) until said JCL job completes.

11. The method as claimed in claim 9, including:
after (f), prompting said user to rerun said recovered corrected JCL job.

12. The method as claimed in claim 9, wherein said automatically correcting said recoverable error includes:
if said recoverable error is a dataset not found error, automatically executing a catalog locate to find a correct volume serial number.

13. The method as claimed in claim 9, wherein said automatically correcting said recoverable error includes:
if said recoverable error is an out of space error, automatically executing a system managed storage automatic class selection routine to find a storage area with sufficient space.

14. The method as claimed in claim 9 wherein said automatically correcting said recoverable error includes:
if said recoverable error is a volume fragmentation error, automatically changing allocation amounts to fit on existing volumes.

15. The method as claimed in claim 9, wherein said automatically correcting said recoverable error includes:
if said recoverable error is a volume count error, automatically changing allocation amounts to fit on existing volumes.

* * * * *